United States Patent Office 3,580,826
Patented May 25, 1971

3,580,826
ELECTROLYTIC DECOLORING OF FERTILIZER SOLUTIONS
Donald L. Whitfill, Ponca City, Okla., assignor to Continental Oil Company, Ponca City, Okla.
No Drawing. Filed Feb. 24, 1969, Ser. No. 801,829
Int. Cl. B01k 1/00
U.S. Cl. 204—131                             8 Claims

ABSTRACT OF THE DISCLOSURE

Oxidizable impurities in fertilizer solutions are removed by addition of a soluble chloride followed by in situ electrochemical generation of chlorine.

---

This invention relates to removal of oxidizable matter from fertilizer solutions containing the same. In one aspect, the invention relates to a novel method for bleaching. In another aspect, the invention relates to electrochemical oxidation of color bodies.

Chemical bleaching by use of chlorine, hypochlorites, and other chlorine derivatives has been long known. One problem with chemical bleaching is in controlling the amount of reagent to be added, i.e. if repetitive batches of material are being bleached, addition of a constant amount of reagent to each batch will result in insufficient bleaching of certain batches and use of excess reagent in other batches, depending on variations in the amount of oxidizable matter of color bodies present in the batches. Another disadvantage in bleaching by addition of elemental chlorine resides in the necessity of handling a noxious and toxic reagent.

It is accordingly an object of this invention to provide a method for safely and efficiently oxidizing color body impurities in fertilizer solution. Another object of the invention is to provide a method of bleaching wherein the rate of bleaching is readily controllable.

Other aspects, objects, and the several advantages of the invention will become apparent upon study of this disclosure and the appended claims.

According to the invention, it has been discovered that undesirable color bodies and other oxidizable impurities contained in a fertilizer solution can be destroyed by a process which comprises adding to the solution a soluble chloride and then applying to the solution an electrical potential in amount sufficient to electrolytically generate elemental chlorine therein.

Chlorine bleaching has been used in a wide variety of applications, such as in paper pulp bleaching, water purification, and clothes laundering. So far as is known to the inventor, conventional chlorine bleaching has not yet been used for the removal of finely divided carbonaceous impurities from various fertilizer products containing phosphoric acid derived from the so-called wet process. In addition to the advantages of ready controllability and elimination of the handling of noxious and toxic reagents, subject process is also advantageous in that the nascent chlorine which is generated in situ is a highly effective bleaching agent.

The electrolytic generation of elemental chlorine by applying a potential across an electrically conductive solution containing a soluble chloride is a well-known technique, with both the anode and cathode reactions using various chlorides being well documented. The current density and applied potential suitable for generating chlorine without causing undesirable side reactions for a given fertilizer solution are of course readily determinable by routine experimentation. It should be noted in passing, however, that both alternating and direct current are suitable for the method of this invention. Voltages ranging from about 4 to about 20 have been used, as have current densities from about 0.5 to about 2.0 amps per square centimeter. The electrodes used should normally be inert to the environment in which they are used in order to avoid contamination of the material being treated.

The soluble chloride to be used should, by definition, be soluble in the solution being treated, and should of course be chosen so as not to enter undesirable chemical reaction therewith. Exemplary but not limiting of suitable chlorides, depending upon the nature of the solvent, are hydrogen chloride, the alkali metal chlorides such as sodium chloride and potassium chloride, and ammonium chloride. It is especially advantageous to add the soluble chloride in the form of the potassium salt, since the subsequent electrolysis not only bleaches the material but also leaves potassium values therein. The amount of soluble chloride added can vary widely, depending on the concentration of impurity to be oxidized, as will be understood. Amounts as small as one weight percent and less have been used effectively, as have amounts as great as 10 weight percent, although greater quantity is not detrimental.

By fertilizer solutions is meant aqueous solutions or suspensions of plant nutrient comprising or derived from wet process phosphoric acid. Such materials are well known as being of a dark brown to black coloration because of the presence of organic impurities. As an acid of this derivation is concentrated, the coloration becomes worse. The wet process acid is often concentrated and then reacted with ammonia to form what are referred to as fertilizer base solutions, which comprise ammonium polyphosphate, referred to in the trade as 10–34–0, 11–37–0, etc. These base solutions also exhibit the dark objectionable coloration. Base solutions are sometimes further treated by adding thereto urea, ammonium nitrate, potash, and/or other plant nutrients in sufficient amount that a suspension or slurry of solids in liquid is formed, and the dark objectionable coloration survives even this step. All such compositions are amenable to treatment by the method of the present invention.

Time necessary for effective treatment can vary widely, and is readily ascertainable by visual observation. Virtually complete decolorizing can often be effected in as little as 5 or fewer minutes, although the treatment need not be carried out long enough to completely decolorize.

One advantageous feature of the present invention is that the bleaching or oxidizing action is highly amenable to control, in that visual observation, light transmission, or color measurement can be used to increase or decrease the applied voltage and thus the rate of electrolysis depending on the observed rate of change of color, and the reaction can be readily stopped at the desired point by simply shutting off the current.

The invention will now be further explained by reference to the following examples, which are illustrative and not limiting. Anode area in all experiments was 4.0 square centimeters.

EXAMPLE 1

95.0 g. of wet process filter acid (30% $P_2O_5$) and 5.0 g. of concentrated HCl were electrolyzed for thirty minutes at 5–8 amps of current. All the dark coloration was removed, leaving a light green solution.

EXAMPLE 2

95.0 g. of wet process filter acid (30% $P_2O_5$) and 5.0 g. of KCl were electrolyzed for thirty minutes at 5–8 amps of current. All the dark coloration was removed, leaving a light green solution.

EXAMPLE 3

95.0 g. of wet process merchant acid (54% $P_2O_5$) and 5.0 g. of concentrated HCl were electrolyzed for thirty minutes at 2–4 amps of current. The solution foamed excessively, but all the dark coloration was removed, leaving a green solution.

EXAMPLE 4

99.0 g. of wet process filter acid (30% $P_2O_5$) and 1.0 g. of concentrated HCl were electrolyzed for one hour at 5–8 amps of current. Some, but not all, of the dark coloration was removed, leaving a light brown solution.

EXAMPLE 5

200.0 g. of filter grade phosphoric acid containing 5.0% HCl were electrolyzed at 6 amps. The applied voltage was approximately 4 volts. Seven minutes were required to remove the dark coloration.

EXAMPLE 6

200.0 g. of filter grade phosphoric acid containing 10.0% HCl were electrolyzed at 7 amps. Five minutes were required to remove the dark coloration.

EXAMPLE 7

200.0 g. of filter grade phosphoric acid containing 5.0% HCl were electrolyzed using an alternating current source. The current was not measured, but 4 volts RMS were applied. The dark coloration was removed in less than eight minutes.

EXAMPLE 8

A 94% methanol, 5% HCl, and 1% Phenyl Red Indicator solution was electrolyzed for three minutes at 5 amps. The red coloration of the indicator was destroyed, leaving a light yellow solution. No change occurred in a 94% methanol, 5% $H_2SO_4$, and 1% Phenyl Red Indicator solution electrolyzed for 10 minutes under the same conditions. This indicates the necessity of having the chloride ion present during the electrolysis.

Having thus described the invention by providing specific examples thereof, it is to be understood that no undue limitations or restrictions are to be drawn by reason thereof and that many variations and modifications are within the scope of the invention.

What is claimed is:

1. The method of decreasing dark coloration of an aqueous fertilizer containing wet process phosphoric acid which comprises:
   (a) adding thereto a soluble chloride, and
   (b) applying across the chloride-containing fertilizer an electrical potential in amount and for a period of time effective to decrease said coloration.

2. The method of claim 1 wherein said chloride is potassium chloride.

3. The method of claim 2 wherein the potential is between about 4 and about 20 volts.

4. The method of claim 2 wherein the current density is between about 0.5 and about 2.0 amps/cm.$^2$.

5. The method of claim 4 wherein said current is D.C.

6. The method of claim 4 wherein said current is A.C.

7. The method of decreasing dark coloration of an aqueous fertilizer selected from the group consisting of wet process phosphoric acid and ammoniated derivatives thereof which comprises:
   (a) adding to said fertilizer at least about 1 weight percent of a soluble chloride selected from the group consisting of hydrogen chloride, ammonium chloride, and alkali metal chlorides,
   (b) applying across said fertilizer containing said chloride an electrical potential sufficient to produce therein a current density of at least about 0.5 amperes/square centimeter, and
   (c) discontinuing application of said potential when said fertilizer reaches a predetermined decreased color intensity.

8. The method of claim 7 wherein said applying is effected for at least about 5 minutes.

References Cited

UNITED STATES PATENTS

| | | | |
|---|---|---|---|
| 2,824,831 | 2/1958 | Conwell et al. | 204—131 |
| 1,630,074 | 5/1927 | Rogers et al. | 204—131 |
| 1,062,016 | 5/1913 | Langlet | 204—131 |
| 712,045 | 10/1902 | Crooke | 204—131 |
| 462,694 | 11/1891 | Foelsing | 204—131 |

JOHN H. MACK, Primary Examiner

R. L. ANDREWS, Assistant Examiner